(12) United States Patent  (10) Patent No.: US 6,264,231 B1
Scully  (45) Date of Patent: Jul. 24, 2001

(54) AXLE SUSPENSION CONNECTION

(75) Inventor: Robert M. Scully, Downers Grove, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/528,626

(22) Filed: Mar. 20, 2000

(51) Int. Cl.$^7$ ................................................ B60G 5/00
(52) U.S. Cl. ................................ 280/680; 280/124.116; 280/677; 248/228.1; 403/373; 403/261
(58) Field of Search .................................. 280/676, 677, 280/680, 678, 679, 681, 682, 683, 684, 685, 686, 687, 124.128, 124.153, 125.116; 403/373, 374.2, 374.3, 333, 256, 257, 261; 248/228.1, 228.2, 228.5, 200, 201, 220.1, 220.21, 222.13, 223.31

(56) References Cited

U.S. PATENT DOCUMENTS

| | | | |
|---|---|---|---|
| 3,785,673 | * 1/1974 | Harbers, Jr. et al. | 280/124.116 |
| 3,913,937 | * 10/1975 | Longworth et al. | 280/680 |
| 3,933,367 | * 1/1976 | Tamas | 280/680 |
| 4,131,297 | * 12/1978 | Raidel | 280/682 |
| 4,541,653 | * 9/1985 | Raidel | 280/124.116 |
| 4,699,399 | 10/1987 | Jable et al. | |
| 4,858,949 | * 8/1989 | Wallace et al. | 280/124.116 |
| 5,078,420 | * 1/1992 | Jable et al. | 280/680 |
| 5,921,570 | 7/1999 | Lie . | |
| 5,950,971 | 9/1999 | Koumbis et al. . | |

FOREIGN PATENT DOCUMENTS 0 504 593-A1 * 9/1992 (EP) .

* cited by examiner

*Primary Examiner*—Lanna Mai
*Assistant Examiner*—Ruth Lan
(74) *Attorney, Agent, or Firm*—Cook, Alex, McFarron, Manzo, Cummings & Mehler, Ltd.

(57) ABSTRACT

In a tandem axle suspension a system for connecting the end of a rectangular axle housing to bushing in the eye at the adjacent end of a walking beam. The system comprises an axle bracket mounted on the bushing in the walking beam eye. The axle bracket has a platform on which the end of the axle housing is supported on a pair of lower axle housing corner engaging clamps. The upper corners of the axle housing are engaged by a pair of upper axle housing corner clamps which may be identical with the lower clamps. Bolts are used to clamp the assembly of four axle housing corner clamps to the four corners of the axle housing and to the platform on the axle bracket. The clamping force applied to each corner of the axle housing is equal and opposite to the clamping force applied to the diagonally opposite corner. With each clamping force being counter balanced by an equal and opposite clamping force there is no tendency to distort the axle housing whereby re-torquing of the assembly is not required even after long periods of service.

6 Claims, 7 Drawing Sheets

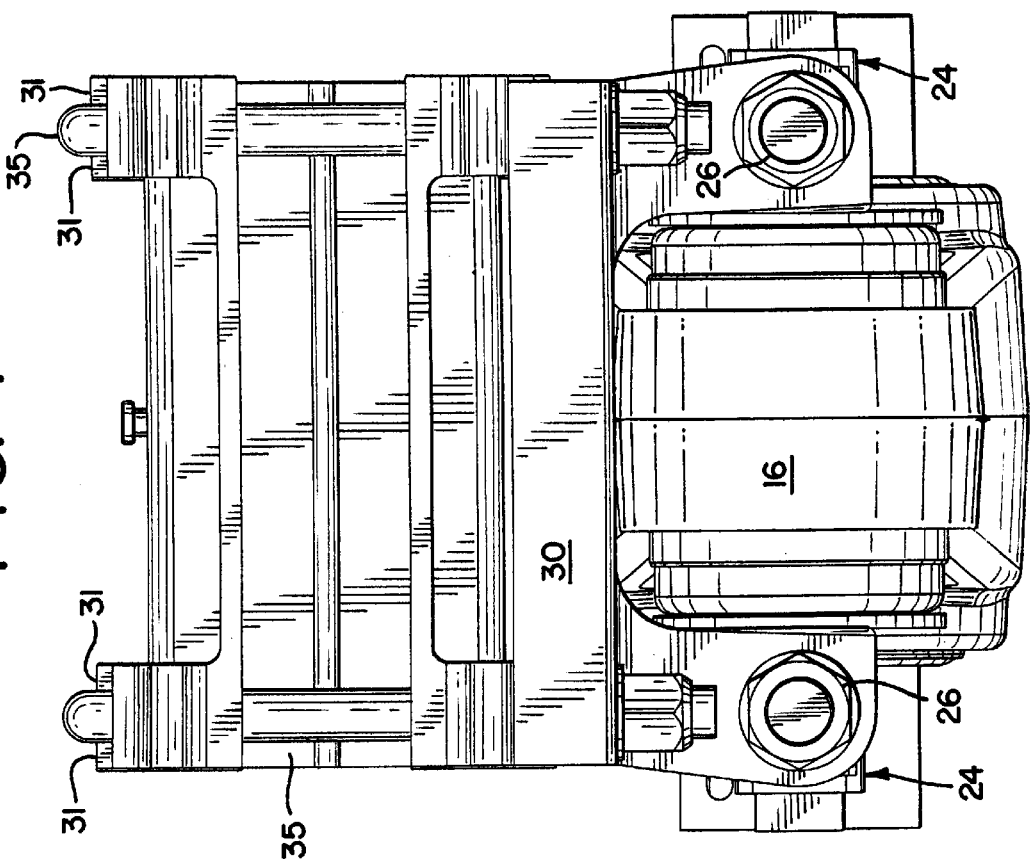
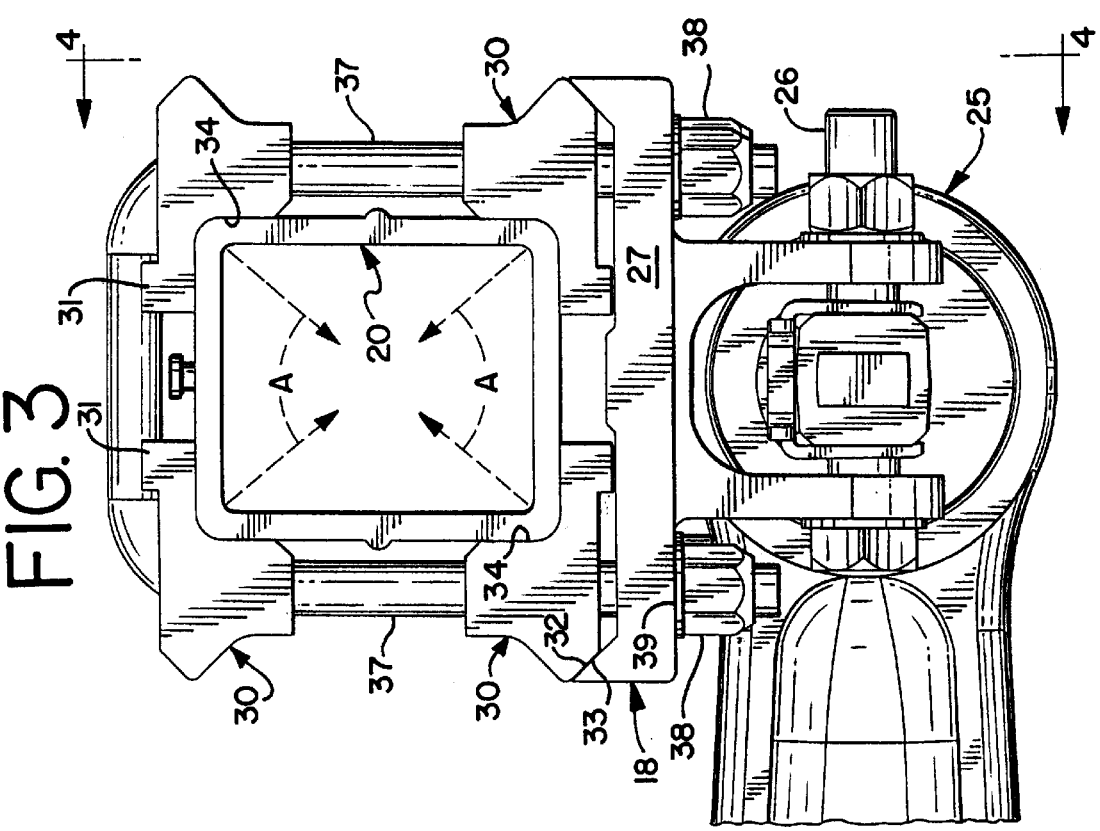

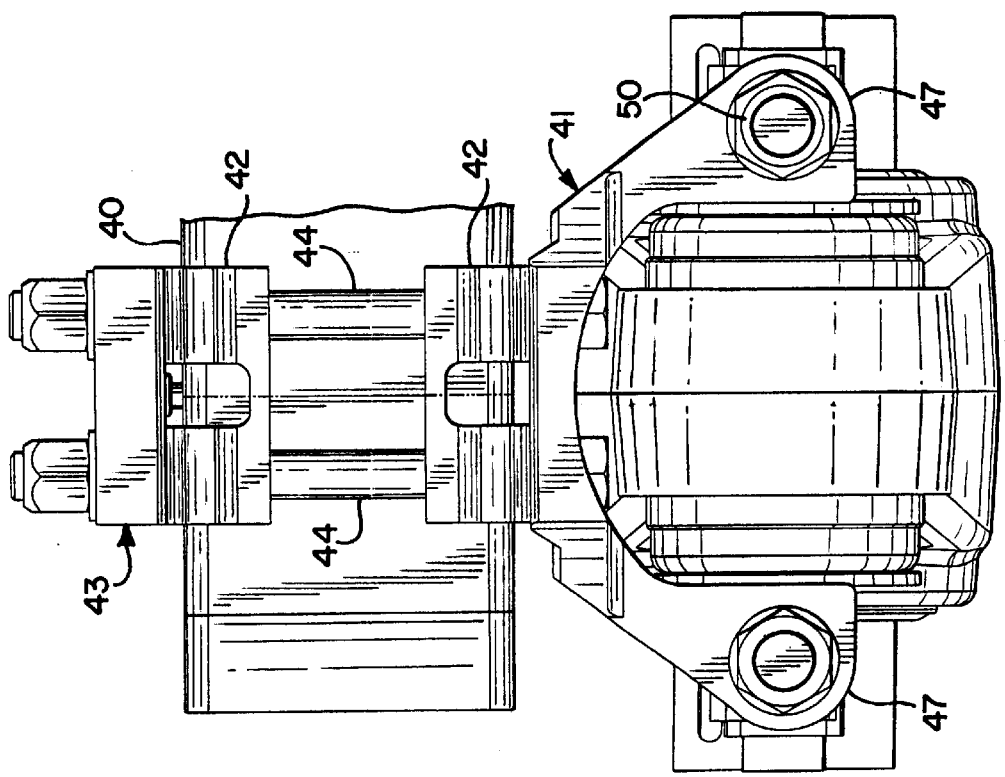
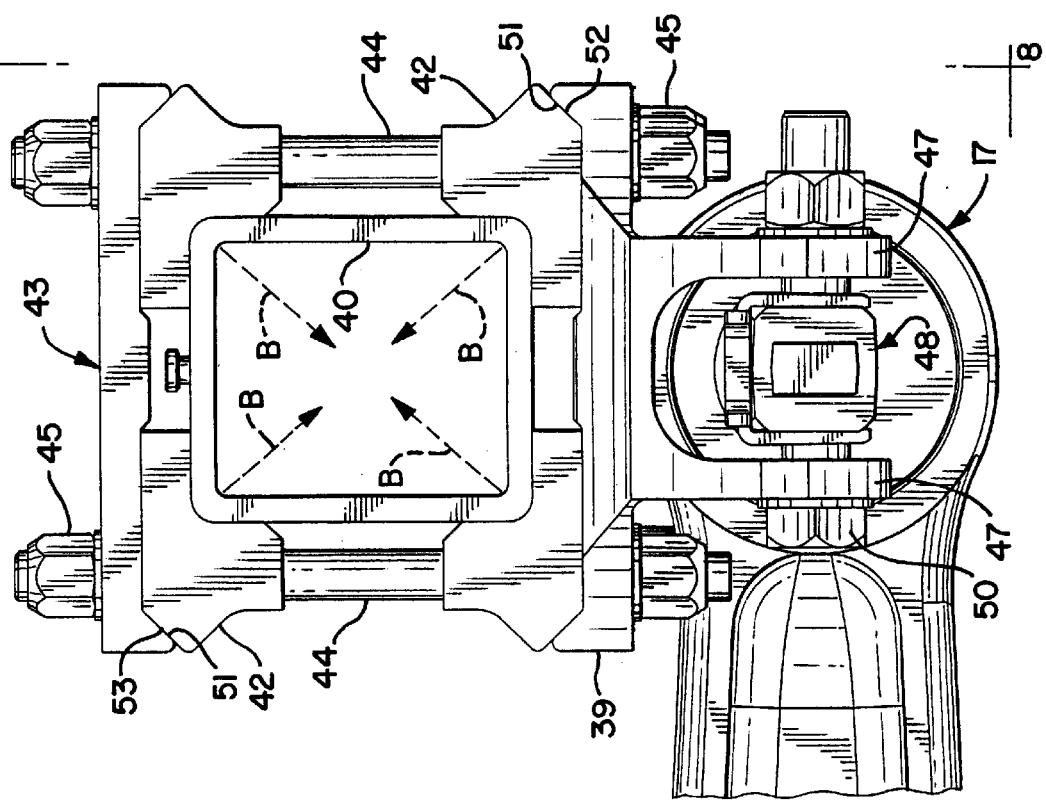

AXLE SUSPENSION CONNECTION

BACKGROUND AND DESCRIPTION OF THE INVENTION

1. Field of the Invention

The present invention relates generally to improvements in mounting the opposite ends of the transverse axle housings in a tandem axle suspension. The invention is shown and described as applied to a walking beam suspension, but could also be applied to other single- or multiple-axle suspensions.

2. Discussion

Tandem axle walking beam suspensions are well known in the art and are widely used, particularly on heavy duty trucks and truck tractors. Suspensions of the type to which the present invention relate are disclosed, for example, in Jabel and Taylor U.S. Pat. No. 4,699,399 dated Oct. 13, 1987. In such suspensions the opposite ends of the axle housings are mounted on the axle brackets which in turn are mounted on the adjacent ends of each pair of walking beams. One particular arrangement for mounting the end of an axle housing on an axle bracket which in turn is mounted on the adjacent end of a walking beam is shown and described in U.S. Pat. No. 4,699,399.

The present invention is directed to the means whereby the end of an axle housing is mounted on its associated axle bracket whereby the clamping forces applied to the axle housing are so balanced as not to appreciably distort or deform the normal shape of the housing. Heretofore, U-bolts have been used to clamp the ends of the axle housings to the axle brackets, or the brackets have been welded to the axle housings. Welded attachments have drawbacks, notably variations in weld quality and strength, and undesirable effects on materials of attaching parts due to heat of welding. These problems increase when the welding is performed in the field outside of a controlled factory environment. With previous clamped connections, the clamping forces and pressures exerted upon the axle housings are very great with the result that the relatively thin-walled axle housings yield or deform to a significant degree over periods of use. This yielding and distortion of the axle housing shape creates an objectionably frequent requirement to re-torque the attaching nuts on U-bolts in the field. Due to the sensitivity of a typical axle housing to the magnitude of the clamping force applied to it, proper detailed torque-up procedures for installation and maintenance should be carefully followed. If the compression clamping load exerted by the U-bolts is not properly applied within a safe range when a suspension is installed or during maintenance, the axle housing can become over stressed due to the dynamic loads introduced during operation, and seriously deformed. As a result, the clamped assembly can loosen if not timely re-torqued and can eventually come apart creating an undesirable condition. Accordingly, it is desirable to clamp the ends of the axle housings to the axle brackets in such a way that the housings are not appreciably deformed and the need for re-torquing is eliminated, or the frequency thereof at least greatly reduced.

Having regard for the foregoing considerations, the object of the invention, generally stated, is the provision of an improved way or system for clamping an end of an axle housing to an axle bracket mounted on the adjacent end of a walking beam in a tandem axle suspension so as to securely clamp the axle housing in place without welding, and without distorting or deforming forces being applied to the axle housing thereby eliminating damage to the axle housing, and eliminating, or substantially reducing the need for re-torquing.

Certain other, and certain more specific, objects of the invention will be apparent to those skilled in the art in view of the following description of three embodiments of the invention taken in connection with the accompanying drawings, wherein:

BRIEF DESCRIPTION OF THE DRAWINGS

FIG. 3 is a right end elevational view of the structure shown in FIG. 2;

FIG. 4 is a rear elevational view taken on line 4—4 of FIG. 3;

FIG. 7 is an elevational view of the right end of the structure shown in FIG. 6;

FIG. 8 is a rear end elevational view taken on line 8—8 of FIG. 7;

Referring to FIG. 1, a tandem axle walking beam suspension is shown interconnecting a truck chassis, represented by frame member 10, to fore-and-aft sets of dual wheels 11—11. It will be understood that in FIG. 1 only one side of the suspension is shown and that the suspension structure as shown in FIG. 1 is duplicated on the opposite side of the vehicle.

Figure 1:
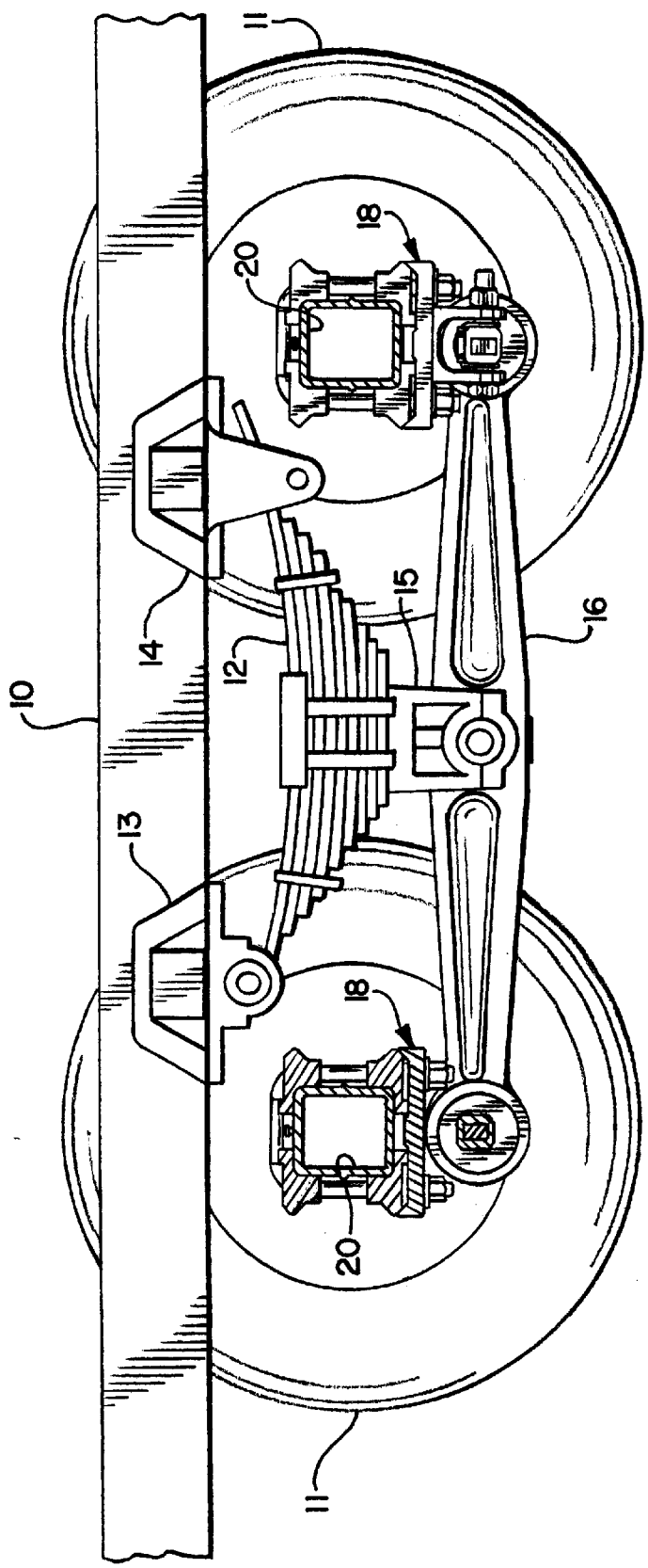
FIG. 1 is a side elevational view, considerably simplified by omission of detail, of a representative type of tandem axle walking beam suspension embodying the invention.
Figure 2:
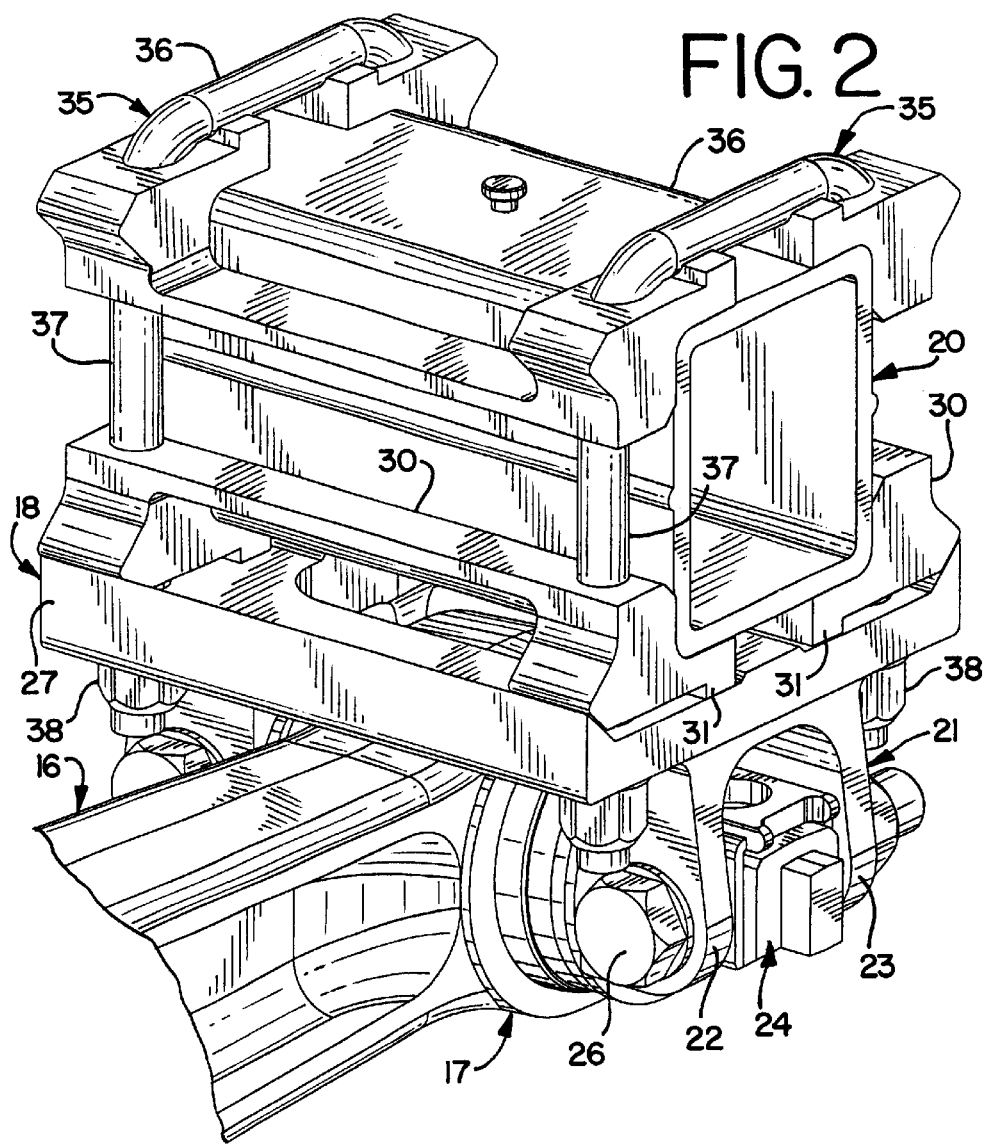
FIG. 2 is a perspective view on enlarged scale and partly broken away, of the connection between one end of the equalizing beam or walking beam of FIG. 1 and the adjacent end of the axle housing.
Figure 5:
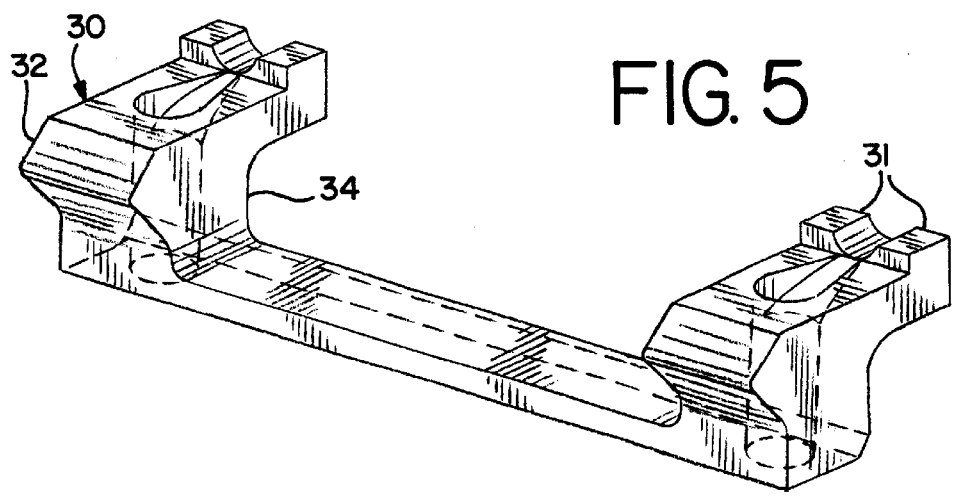
FIG. 5 is a perspective view of one of four axle housing corner engaging clamps used in the structure shown in FIGS. 2–4.
Figure 6:
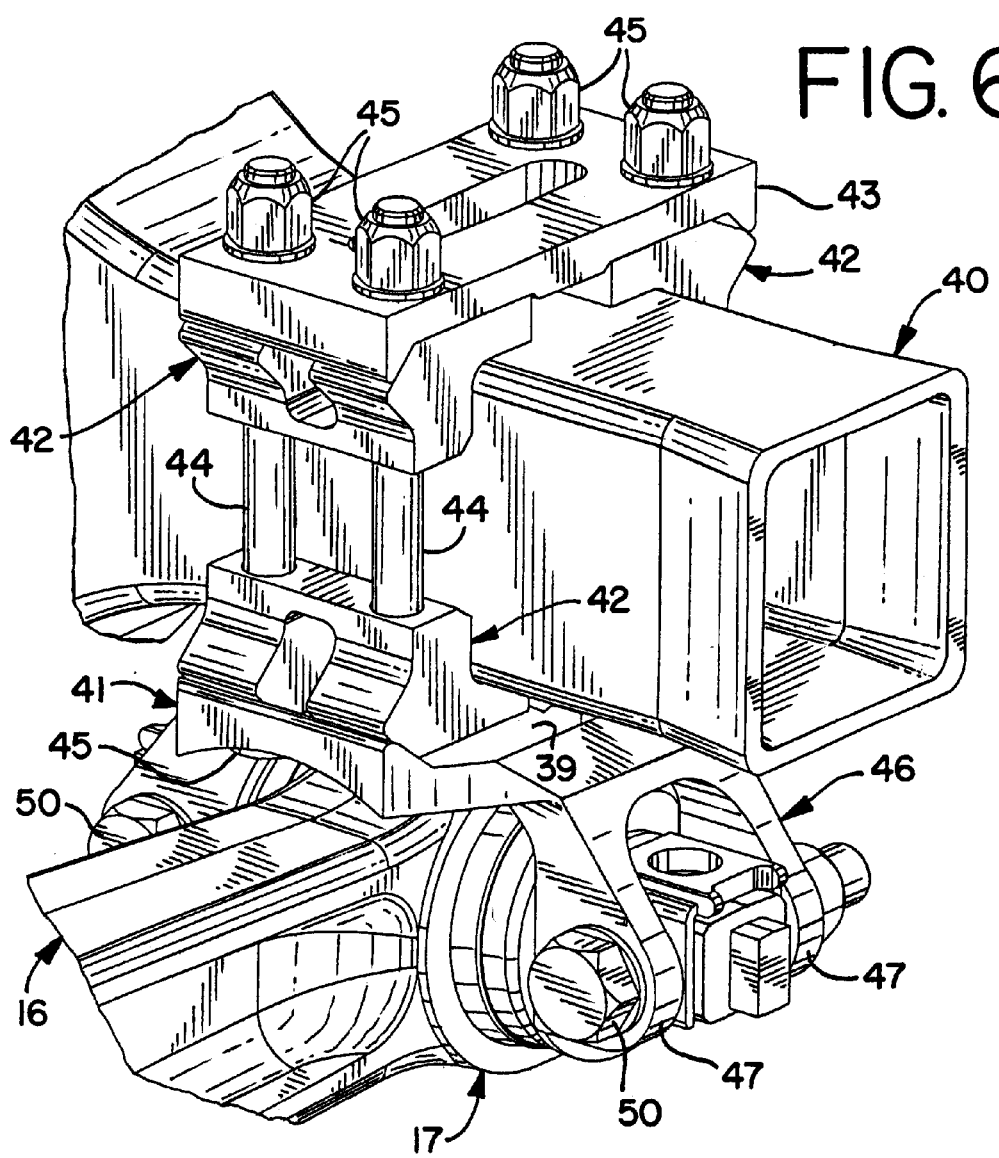
FIG. 6 is a perspective view of a second embodiment of the invention similar to FIG. 2 and showing an axle housing with a differential housing.
Figure 9:
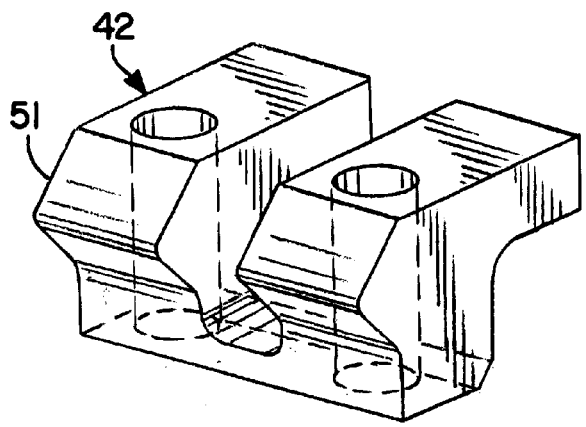
FIG. 9 is a perspective view of one of four axle housing corner engaging clamps used in the structure shown in FIGS. 6–8.
Figure 10:
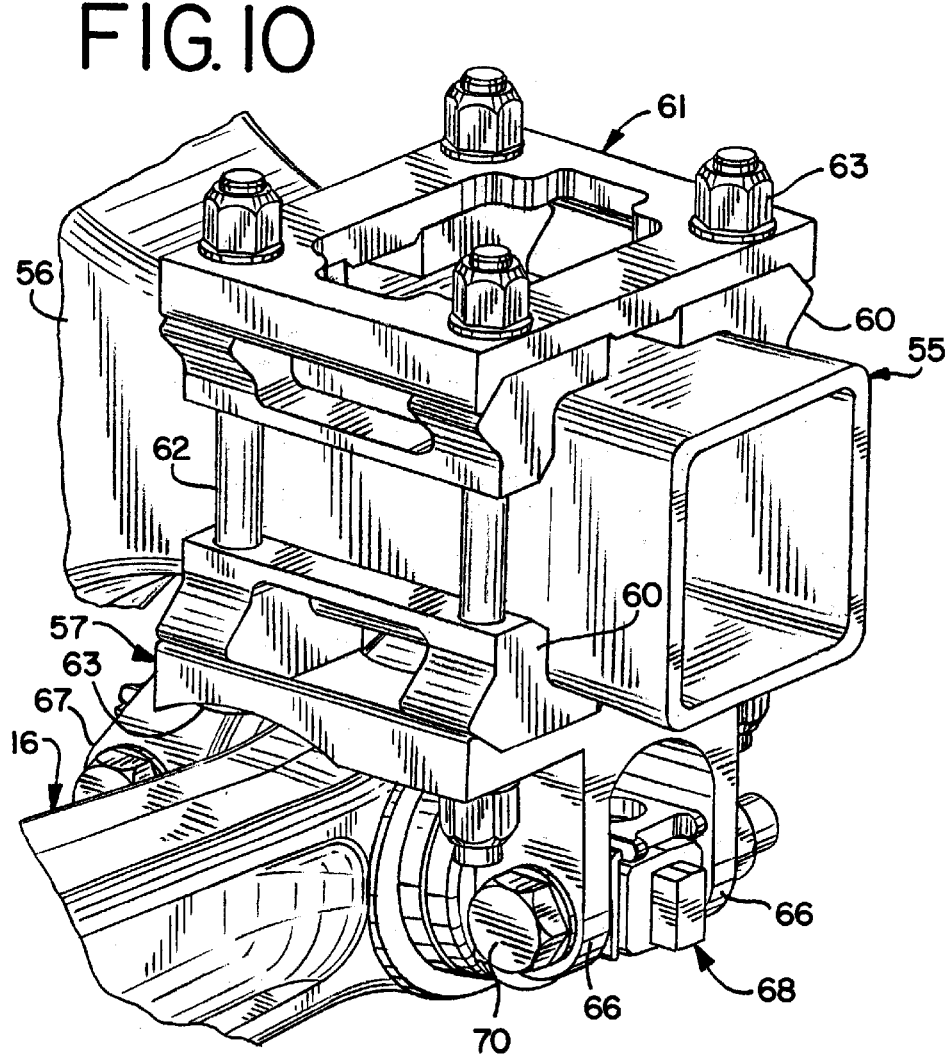
FIG. 10 is a perspective view of a third embodiment of the invention similar to FIG. 6.
Figure 13:
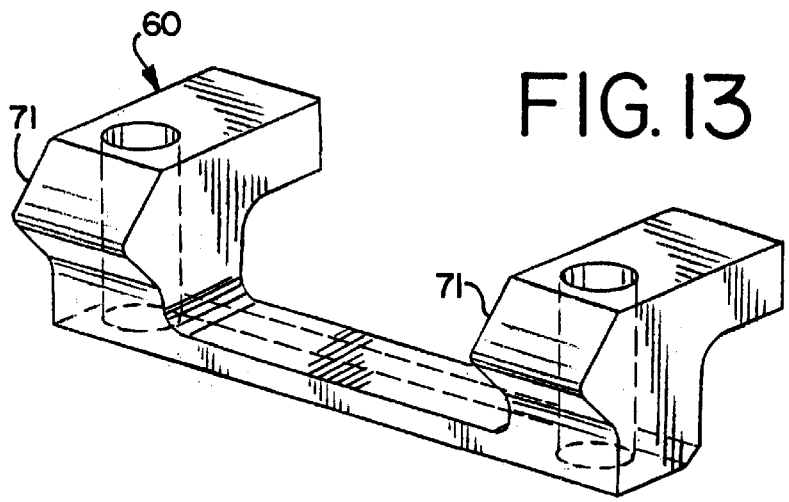
FIG. 13 is a perspective view of one of four axle housing corner engaging clamps used in the structure shown in FIGS. 10–12.

The opposite ends of a leaf spring 12 are connected in known manner to front and rear brackets 13 and 14, respectively. The spring 12 is likewise mounted in known manner on a saddle 15 pivotally mounted on the middle of the walking beam or equalizing beam 16. The opposite ends of the beam 16 are provided with bushing-receiving eye formations 17—17 integrally formed on the ends of the beam. The eye formations 17 have pivotally connected thereto axle brackets 18—18 on which the adjacent ends of axle housings 20—20 are mounted.

The construction of the tandem axle walking beam suspension shown in FIG. 1, as thus far described, may be considered conventional and representative of only one form of "walking beam" type suspension. Other types use different springing media such as rubber and air bags. However, the walking beams and beam end connections are the common parts in the various tandem axle or walking beam suspensions.

The improvements provided by the present invention pertain particularly to an axle bracket and the assembly in which the end of an axle housing is secured to the axle bracket without subjecting the housing to deforming or distorting forces.

Referring to FIGS. 2–5 the axle bracket 18 has a pair of integrally formed depending and bifurcated bracket arms indicated generally at 21—21. The bracket arms 21 straddle opposite sides of the eye formation 17 at the adjacent end of the walking beam 16. Each bracket arm 21 has a pair of fore-and-aft branches 22 and 23 which straddle opposite sides of a composite bushing indicated generally at 24 projecting on opposite sides of the walking beam eye formation 17. Bolts indicated generally at 26—26 extend horizontally through the axle bracket branches 22 and 23 and the projecting end of the bushing 24 as shown. For further details of the construction of the bushings 24 and of the interconnection of the branches 22 and 23 by means of the bolts 26 reference may be had to the above-mentioned U.S. Pat. No. 4,699,399 the disclosure of which is incorporated by reference herein.

The bed or platform 27 of the axle bracket 18 is spaced above the top of the eye 17 and walking beam 16 and serves as the support for a pair of identical lower axle housing corner engaging clamps indicated generally at 30—30. Each clamp 30 is formed with spaced bosses 31 which rest on the upper surface of the platform 27 of the axle bracket 18. Each clamp 30 also has an inclined surface 32 (FIGS. 3 and 5) which is wedged against a correspondingly inclined surface 33 on the platform 27. Each clamp 30 also has an inside right angular surface 34 (FIG. 3) which engages one of the lower right angle corners of the axle housing 20.

The upper right angle corners of the axle housing 20 are similarly engaged by the inner right angular surfaces 34 of a pair of upper clamps 30—30 which, preferably, are identical to the lower pair of clamps 30—30.

The assembly of the axle bracket 18, axle housing 20 and four axle housing corner engaging clamps 30 is firmly secured together by a pair of U-bolts indicated generally at 35—35. The bight portions 36 of the U-bolts 35 rest on the tops of the upper pair of clamps 30 in the channels formed between the bosses 31. Each of the legs 37—37 of the U-bolts 35 extends downwardly through a set of three vertically aligned holes, two being in the upper and lower clamps 30 and one being in the platform or bed 27 of the axle bracket 18. The threaded lower ends of the U-bolts 35 are provided with nuts 38—38 and lock washers 39—39.

It will be seen that when the nuts 38 are tightened the elbows in the U-bolts 35 draw the upper set of clamps 30—30 against the upper corners of the axle housing 20 while the platform 27 of the axle bracket 18 draws the lower pair of clamps 30 upwardly against the lower corners of the axle housing 20. The engagement between the inside right angular corner surfaces 34 of the clamps 30 with the respective corners of the axle housing 20 applies to the axle housing corner clamping forces which take the direction of the arrows A—A (FIG. 3). The direction of the compression forces indicated by the arrows A bisect the axle housing corners and each force is opposed by an equal and opposite force on the diagonally opposite corner of the axle housing 20. As a result of this balancing of forces on all four corners the tendency of the axle housing 20 to become mis-shapened by reason of the clamping forces exerted on it by the U-bolts 35 is eliminated. Consequently, once the assembly has been installed and the nuts 37 torqued to the predetermined setting, there is little or no tendency thereafter for the assembly to become loosened with a requirement for re-torquing.

In the embodiment shown in FIGS. 2–5 the elbows in the U-bolts connecting the bight portions 36 and the legs 37 engage the upper corners of the upper corner clamps 30—30 to exert the diagonal forces on the corners of the axle housing 20 while the lower clamps 30 utilize the wedge surfaces 32–33 to exert the diagonal forces against the lower corners of the axle housing 20.

In FIGS. 6–9 a second embodiment of the invention is shown wherein an assembly similar to that in the first embodiment is utilized to attach an axle housing indicated generally at 40 to the eye formation 17 of the walking beam 16. The axle housing 40 includes a differential housing. The assembly shown in FIGS. 6–8 comprises an axle bracket 41 having a platform 39, a pair of lower clamps 42, a pair of upper clamps 42, a clamp engaging upper plate indicated generally at 43, and bolts 44—44 with nuts 45—45 on their upper and lower threaded ends. Each axle bracket 41 has arms 46 which depend from the platform 39 and straddle the eye formation 17 in the walking beam 16 with each arm being bifurcated so as to have fore-and-aft branches 47—47 which straddle the projecting ends of the walking beam bushings 48. Bolts 50—50 interconnect the axle brackets 44 to the bushings 48 in the same manner as in U.S. Pat. No. 4,699,399 and the embodiment of FIGS. 2–5. The inner bracket arms 46 are spaced from the differential housing in the axle housing 40.

Each of the lower pair of axle corner engaging clamps 42 has an inclined or bevelled wedge surface 51 (FIGS. 7–9) which engages a bevelled wedge surface 52 on the platform 39. Likewise, the upper plate 43 has bevelled or inclined wedge surfaces 53 which engage the bevelled wedge surfaces 51 on the upper pair of corner clamps 42.

As in the embodiment of FIGS. 2–5, in the embodiment of FIGS. 6–9 diagonal clamping forces are applied to the corners of the axle housing 40 as indicated by the arrows B—B (FIG. 7). The clamping force applied to one corner is counter balanced by the force applied to the diagonally opposite corner with the result that there is no appreciable deformation or distortion of the axle housing 40. Accordingly, there is seldom, if any, need for re-torquing of the bolts 44 during prolonged periods of service.

Figure 12:
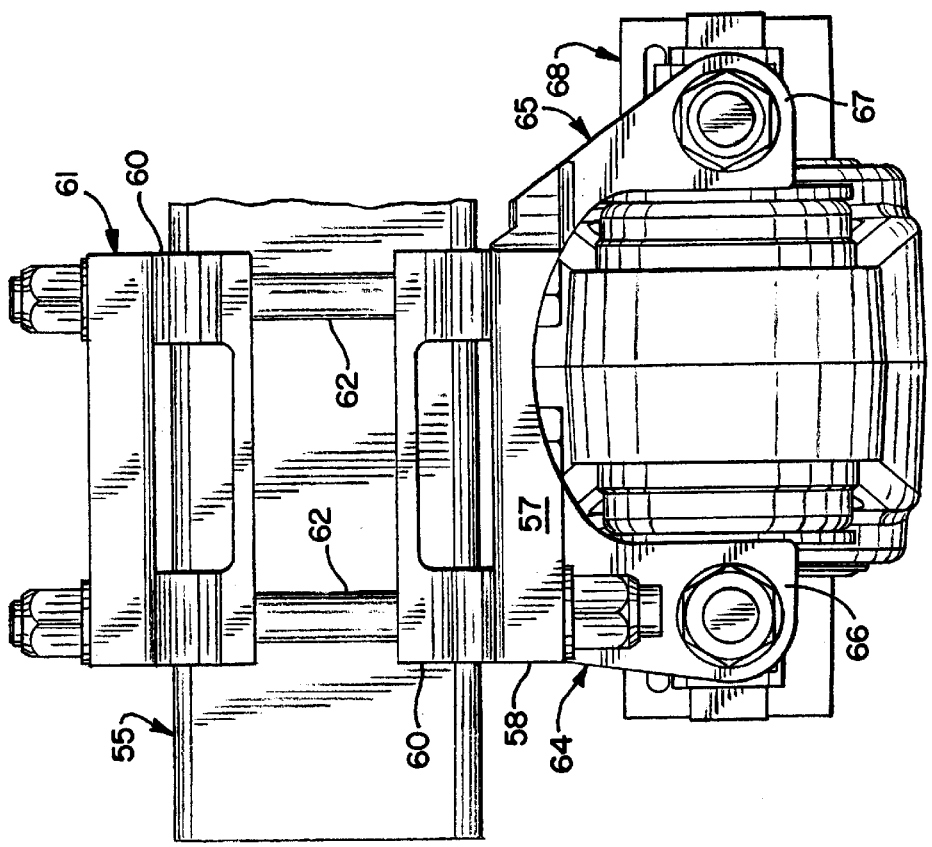
FIG. 12 is a rear end elevational view taken on line 12—12 of FIG. 11.

In FIGS. 10–13 a third embodiment of the invention is shown wherein an assembly similar to that in the second embodiment of FIGS. 6–9 is utilized to attach an axle housing indicated generally at 55 having a differential housing 56 to the eye formation 17 of the walking beam 16. The assembly shown in FIGS. 10–13 comprises an axle bracket indicated generally at 57 having a platform 58, a pair of lower axle housing corner clamps 60—60, a pair of upper axle housing corner clamps 60, a clamp engaging and hold down upper plate indicated generally at 61, and bolts 62—62 with nuts 63 on their upper and lower threaded ends. Each axle bracket 57 has arms 64 and 65 (FIG. 12) depending from the platform 58 and straddling the eye 17 in the walking beam 16. Each depending inner arm 65 extends downwardly at an angle as shown in FIG. 12 whereby the assembly can be located off center of the walking beam 16 and its eye formation 17 so as to clear the differential housing 56. Each arm 64 and 65 is bifurcated so as to have fore-and-aft branches 66—66 and 67—67 which straddle the projecting ends of the walking beam bushings indicated generally at 68. Bolts 70—70 interconnect the axle brackets 57 to the bushings 68 in the same manner as in U.S. Pat. No. 4,699,399 and in the first and second embodiments of FIGS. 2–5 and 6–9.

Each of the lower pair of axle housing corner engaging clamps 60 has an inclined or bevelled wedge surface 71 which engages a wedge surface 72 on the platform 58. Likewise, the upper hold down plate 61 has bevelled or inclined wedge surfaces 72 which engage the bevelled wedge surfaces 71 on the upper pair of corner clamps 60.

Figure 11:
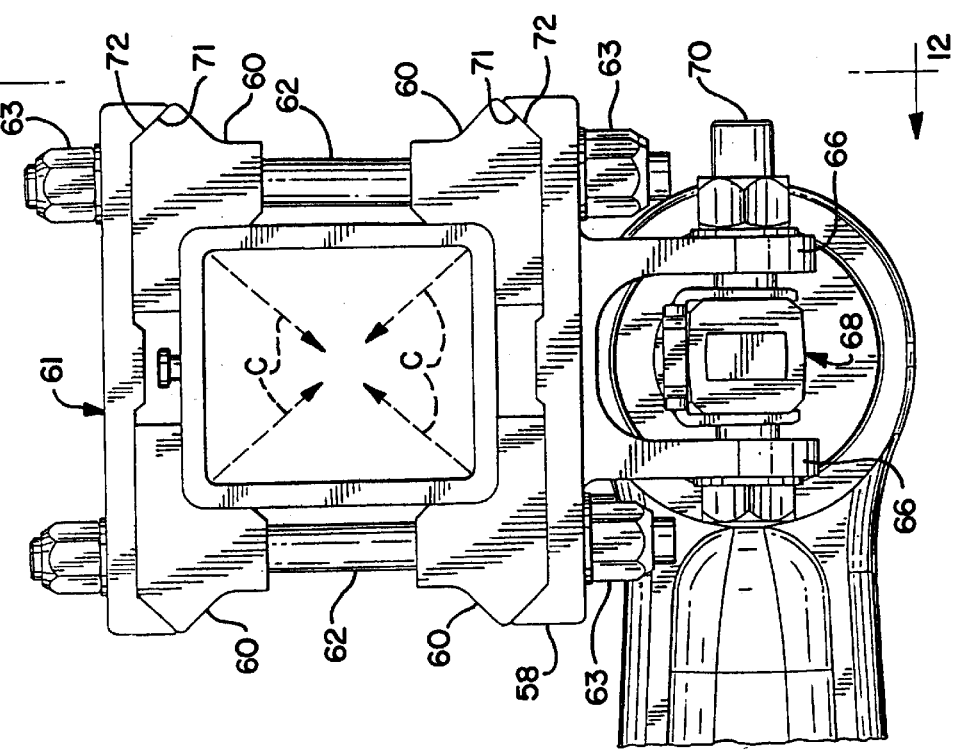
FIG. 11 is a right side elevational view of the structure shown in FIG. 10.

As in the embodiments of FIGS. 2–5 and 6–9, in the embodiment of FIGS. 10–13 diagonal clamping forces are applied to the four corners of the axle housing 55 as indicated by the arrows C—C (FIG. 11). It will be seen that the clamping force applied to one corner is counter balanced by the force applied to the diagonally opposite corner with the result that there is no appreciable deformation or distortion of the axle housing 55. Therefore, there is seldom, if any, need to re-torque the bolts of 62 during prolonged periods of service.

Having described the invention generally, and in detail in connection with the drawings and presently preferred embodiments, those skilled in the art will be able to practice the invention, either according to the embodiments disclosed or other embodiments without departing from the spirit and scope of the appended claims.

What is claimed is:

1. In a tandem axle walking beam suspension including a pair of transverse axle housings having rectangular ends and a pair of fore-and-aft walking beams extending between the rectangular ends of said axle housings on opposite sides of said suspension, means for connecting each rectangular end of an axle housing to the adjacent end of a walking beam, comprising, an axle bracket mounted on the end of said walking beam, a first pair of lower axle housing corner engaging clamps seated on said axle bracket and engaging the opposite lower corners of said rectangular axle housing end, a second pair of upper axle housing corner engaging clamps seated on and engaging the opposite upper axle housing corners of said rectangular axle housing end, and bolts extending through each set of four sets of vertically aligned bolt holes adjacent the ends in each pair of said lower and upper clamps on opposite sides of said axle housing and in said axle bracket, each said clamp having an axle housing corner engaging surface that applies to the engaged corner of the axle housing the clamping force provided by said bolts in a direction approximately bisecting the engaged axle housing corner.

2. In a tandem axle suspension as called for in claim 1, each of said axle housing corner engaging clamps having the same shape and being interchangeable.

3. In a tandem axle suspension as called for in claim 1, said axle bracket having an upper platform on which said pair of lower axle housing corner engaging clamps are seated, each said lower clamp having an inclined wedge surface engaged by an inclined wedge surface on said upper platform, means connecting said bolts with said, pair of upper clamps for applying clamping force against inclined wedge surfaces of said upper pair of clamps, whereby balanced and opposed clamping forces are applied to the diagonally opposed corners of the axle housing.

4. In a tandem axle suspension as called for in claim 1 wherein said bolts are a pair of downwardly extending U-bolts having their bight portions engaging said pair of upper clamps.

5. In a tandem axle suspension as called for in claim 4 wherein the elbows interconnecting the bight portions and legs of said U-bolts engage said upper pair of clamps and apply thereto forces equaling the forces applied to said wedge surfaces on said lower pair of clamps, the force being applied to one corner of said axle housing being opposed by an equal force applied to the diagonally opposite corner.

6. In a tandem axle suspension as called for in claim 1 wherein a clamping plate is disposed on said upper pair of axle housing corner engaging clamps and said bolts extend through four sets of vertically aligned bolt holes, each set including one hole in said clamping plate, one hole in one of said pair of upper clamps, one hole in one of said pair of lower clamps and one hole in said axle bracket.

* * * * *